US010568063B2

(12) United States Patent
Hanes et al.

(10) Patent No.: US 10,568,063 B2
(45) Date of Patent: Feb. 18, 2020

(54) PRECISE UAV TRACKING IN 3-D SPACE

(71) Applicant: Cisco Technology, Inc., San Jose, CA (US)

(72) Inventors: Michael David Hanes, Lewisville, NC (US); Charles Calvin Byers, Wheaton, IL (US); Gonzalo Salgueiro, Raleigh, NC (US); Joseph Michael Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 15/364,984

(22) Filed: Nov. 30, 2016

(65) Prior Publication Data

US 2018/0152909 A1 May 31, 2018

(51) Int. Cl.
*H04W 64/00* (2009.01)
*G01S 5/02* (2010.01)
*H04L 29/08* (2006.01)
*H04W 4/02* (2018.01)
*H04W 4/029* (2018.01)
*H04W 16/28* (2009.01)

(52) U.S. Cl.
CPC ........... *H04W 64/00* (2013.01); *G01S 5/0252* (2013.01); *G01S 5/0294* (2013.01); *H04L 67/10* (2013.01); *H04W 4/02* (2013.01); *H04W 4/029* (2018.02); *H04W 16/28* (2013.01)

(58) Field of Classification Search
CPC ....... H04W 16/28; H04W 4/02; H04W 4/029; H04W 4/046
See application file for complete search history.

(56) References Cited

U.S. PATENT DOCUMENTS 9,219,993 B2 12/2015 Nakata et al.
9,415,869 B1 8/2016 Chan et al.
(Continued)

FOREIGN PATENT DOCUMENTS

CN 105375957 A 3/2016

OTHER PUBLICATIONS

"Active electronically scanned array", https://en.wikipedia.org/wiki/Active_electronically_scanned_array, Aug. 29, 2016, 11 pages, Wikimedia Foundation, Inc.
(Continued)

*Primary Examiner* — Jaime M Holliday
(74) *Attorney, Agent, or Firm* — Behmke Innovation Group LLC; James Behmke; Stephen D. LeBarron

(57) ABSTRACT

In one embodiment, a first wireless unmanned aerial vehicle (UAV)-locating signal is transmitted by a wireless network access point in a network based on a first UAV-locating mode selected from a plurality of UAV-locating modes. The wireless network access point receives a wireless signal in response to the first transmitted UAV-locating signal, the wireless signal indicative of a location of an airborne UAV, and causes the determination of the location of the airborne UAV based on the received wireless signal. The wireless network access point transmits a second wireless UAV-locating signal based on a second UAV-locating mode selected from the plurality of UAV-locating modes. The selected UAV-locating modes control an emission pattern of an antenna of the wireless network access point.

17 Claims, 10 Drawing Sheets

(56) References Cited

U.S. PATENT DOCUMENTS

| | | | |
|---|---|---|---|
| 10,025,991 B2* | 7/2018 | Seeber | G06K 9/00771 |
| 2015/0370250 A1 | 12/2015 | Bachrach et al. | |
| 2016/0292872 A1* | 10/2016 | Hammond | G01S 17/66 |
| 2016/0337027 A1* | 11/2016 | Jalali | H04B 7/18504 |
| 2017/0039860 A1* | 2/2017 | Just | H01Q 21/28 |
| 2017/0257862 A1* | 9/2017 | Xue | H04W 72/0446 |
| 2017/0301220 A1* | 10/2017 | Jarrell | H04W 4/70 |
| 2018/0097560 A1* | 4/2018 | Jalali | H01Q 3/06 |
| 2018/0115065 A1* | 4/2018 | Valdes Garcia | G01S 13/00 |

OTHER PUBLICATIONS

Anthony, Sebastian., "Think GPS is cool? IPS will blow your mind", http://www.extremetech.com/extreme/126843-think-gps-is-cool-ipswill-blow-your-mind, Apr. 24, 2012, 2 pages, ExtremeTech.

Jones, Electronic., "Distance measurement with radio waves", http://www.instructables.com/id/Distance-measurement-with-radio-waves/, Accessed Sep. 19, 2016, 10 pages, Instructables, Autodesk, Inc.

Paganini, Pierluigi., "An Israeli firm developed a new radar to detect drones", http://securityaffairs.co/wordpress/39327/security/radar-to-detect-drones.html, Aug. 14, 2015, 2 pages, Security Affairs.

Plaugic, Lizzie., "MIT researchers used Wi-Fi to recognize people through walls", http://www.theverge.com/2015/10/28/9625636/rf-capture-mit-wifi-tracking-surveillance-technology, Oct. 28, 2015, 2 pages, The Verge.

Pu, et al., "Whole-Home Gesture Recognition Using Wireless", http://wisee.cs.washington.edu/, Accessed Sep. 9, 2016, 3 pages, Computer Science & Engineering, University of Washington.

Johansen et al., "Unmanned Aerial Vehicle as Communication Relay for Autonomous Underwater Vehicle—Field Tests", NTNU, Dec. 8, 2014, pp. 1-6.

* cited by examiner

PRECISE UAV TRACKING IN 3-D SPACE

TECHNICAL FIELD

The present disclosure relates generally to unmanned aerial vehicles (UAVs) and, more particularly, to precise tracking of UAVs in 3-Dimensional (3-D) space.

BACKGROUND

With the rapid rise in e-commerce sales, more and more goods are being delivered to residential and business addresses. As a result, parcel delivery services are now experiencing record delivery volumes. This increased volume has also led to corresponding increases in road traffic, energy use, and labor expenses, in an effort to continue meeting society's demand for delivered goods.

In general, attempts to streamline the parcel delivery process have focused on central distribution facilities. In particular, many parcel delivery services now utilize large delivery hubs that coordinate deliveries from centralized locations. Within a given hub, packages may be sorted and routed for delivery. However, deliveries from the hub to the addressees still require a fleet of delivery vehicles. For example, a package may be loaded onto a delivery truck at a local hub and driven by a delivery driver to the final destination. Once there, the delivery driver may manually carry the package along the final leg of the delivery route from the delivery truck to the drop off location (e.g., the front steps of a house, the foyer of an apartment complex, etc.).

Unmanned aerial vehicles (UAVs) present a potential way to partially or fully automate the parcel delivery process, as well as having many other promising uses in the future. For example, a UAV may carry a package to a drop off location instead of a delivery driver carrying the package. While UAV-based parcel delivery appears promising, a number of logistical, technical, and regulatory challenges remain before this becomes a reality. UAVs are also potentially important elements in security, media production, entertainment, agriculture, energy, and many other applications. With all of these UAVs in a shared airspace, it becomes vital to know the exact position of each one.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first wireless unmanned aerial vehicle (UAV)-locating signal is transmitted by a wireless network access point in a network based on a first UAV-locating mode selected from a plurality of UAV-locating modes. The wireless network access point receives a wireless signal in response to the first transmitted UAV-locating signal, the wireless signal indicative of a location of an airborne UAV, and causes the determination of the location of the airborne UAV based on the received wireless signal. The wireless network access point transmits a second wireless UAV-locating signal based on a second UAV-locating mode selected from the plurality of UAV-locating modes. The selected UAV-locating modes control an emission pattern of an antenna of the wireless network access point.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network. For example, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
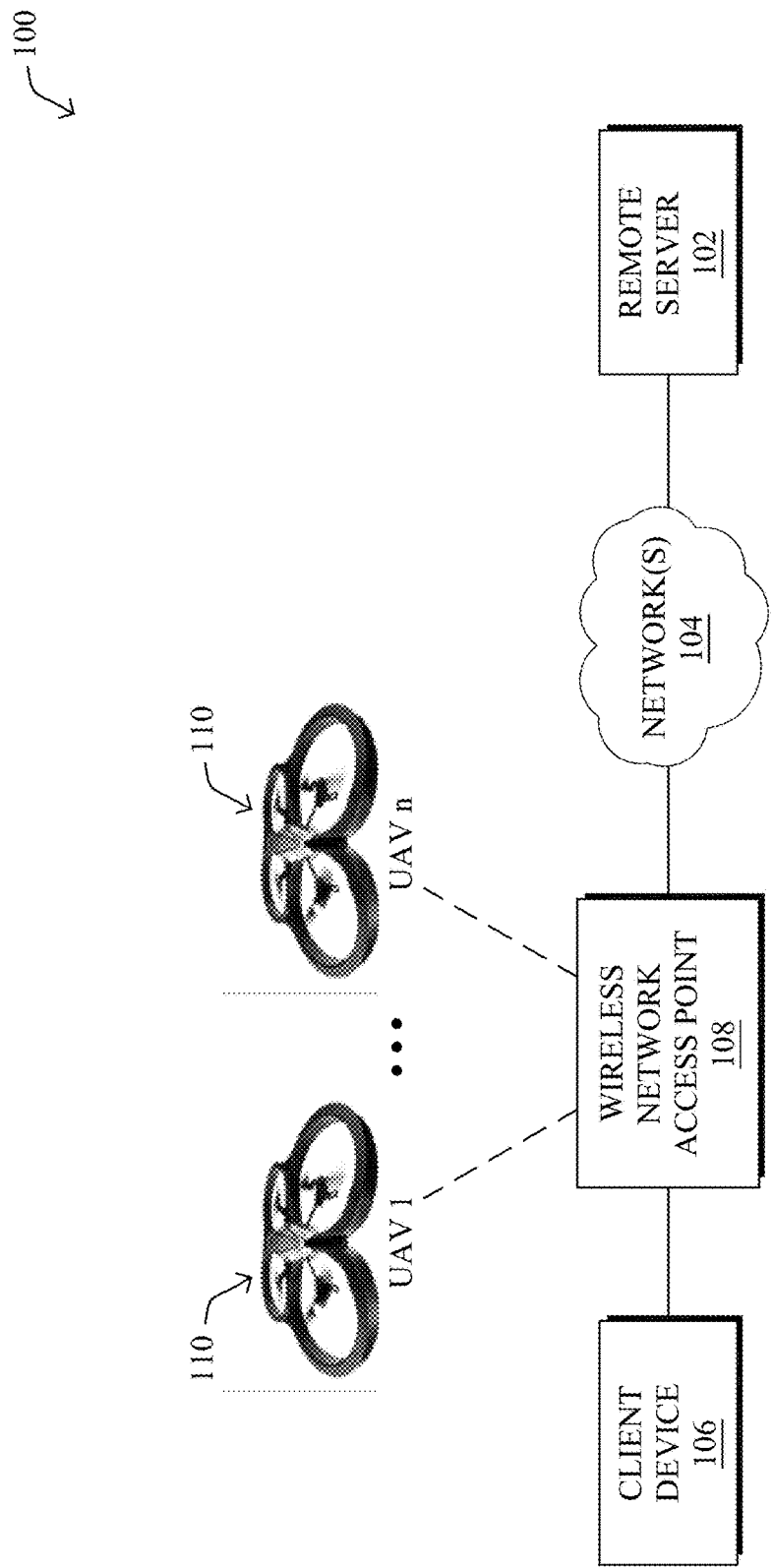
FIG. 1 illustrates an example communication network.

FIG. 1 illustrates an example computer system 100, according to various embodiments of the present disclosure. As shown, a remote device, such as remote server 102, may be in communication with client device 106 via one or more computer networks 104. In particular, remote server 102 provides communication packets through network(s) 104 through wireless network access point 108, which provides the packets wirelessly to client device 106. As will be appreciated, network(s) 104 may include, but are not limited to, local area networks (LANs), wide area networks (WANs), the Internet, cellular networks, infrared networks, satellite networks, or any other form of data network configured to convey data between computing devices, particularly those accessible wirelessly.

Network(s) 104 may include any number of wired or wireless links between wireless network access point 108 and remote server 102. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, combinations thereof, or the like. Example wireless links may include, but are not limited to, near field-based links, Wi-Fi links, satellite links, cellular links, free-space optical links, combinations thereof, or the like.

Client device 106 may be of any form of electronic device operable to communicate via network(s) 104. For example, client device 106 may be a desktop computer, a laptop computer, a tablet device, a smartphone, a wearable electronic device (e.g., a smart watch, a head up display, etc.), a smart television, a set-top device for a television, etc.

Wireless network access point 108 may be any networking device that allows a wireless compliant device to connect to a wired network, typically via radio frequencies. For example, the wireless network access point may be a device sometimes referred to a base station that enables Wi-Fi access to network(s) 104, which, in some embodiments, may use the 2.4, 3.6, 5, and 60 gigahertz radio frequency bands. Wireless network access point 108 may comprise a router or may be connected to a router, such as an edge router of network(s) 104. As such, wireless network access point 108 may be a so-called hotspot, which is a physical location where Wi-Fi access is available. Further examples of wireless network access point 108 may include, but are not limited to, cellular transceivers, 6LowPAN access points, or any other form of wireless device that provides network connectivity to another device. In embodiments of the present disclosure, wireless network access point 108 may further provide wireless communication links between network(s) 104 and one or more unmanned aerial vehicles 110, such as UAV1 to UAVn, as described in more detail below, and, further, may have computation and storage capabilities (i.e., may be a fog computing node).

Figure 2:
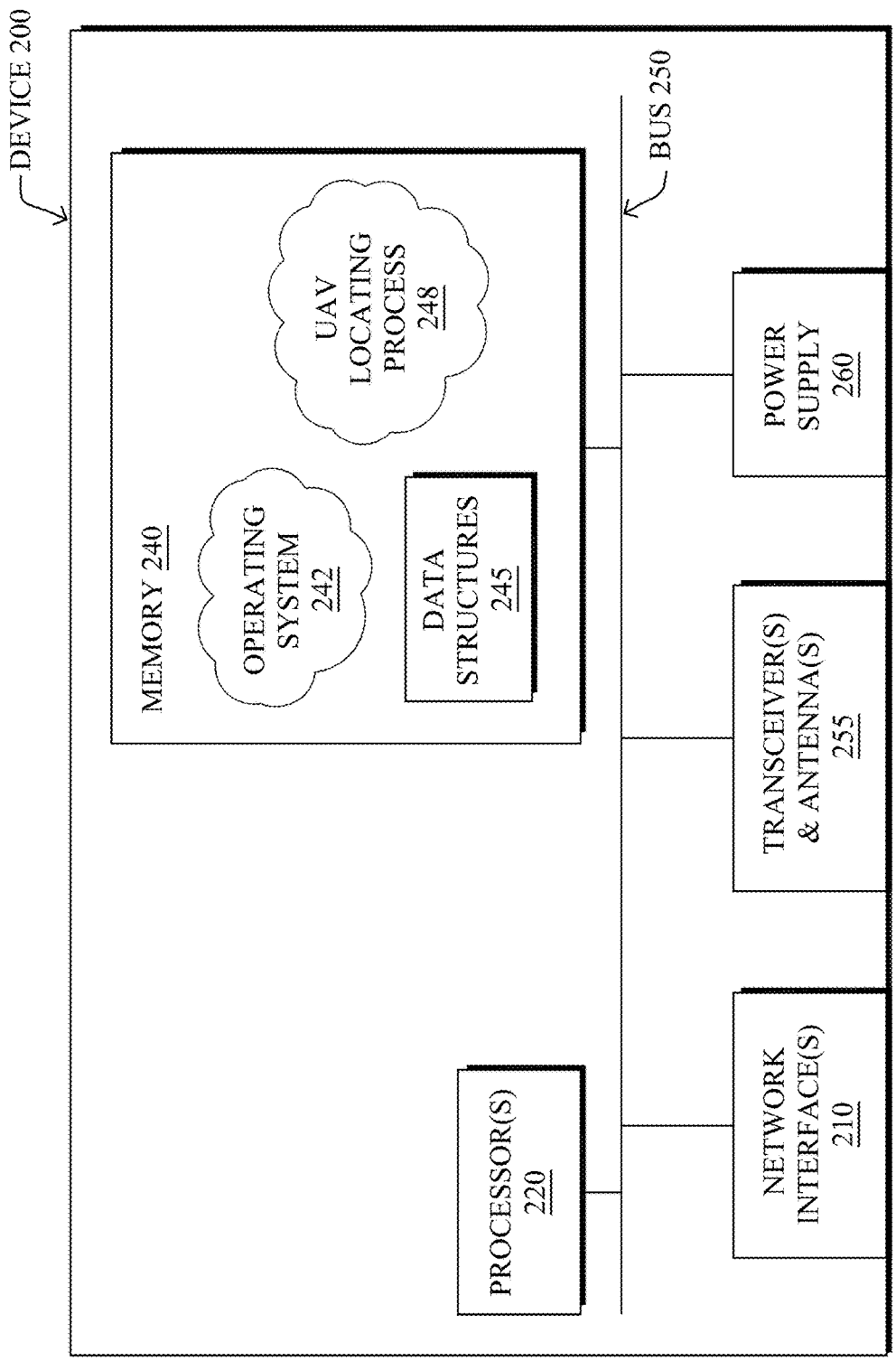
FIG. 2 illustrates an example network device/wireless network access point.

FIG. 2 is a schematic block diagram of an example device 200 that may be used with one or more embodiments described herein. For example, device 200 may be local to UAV(s) 110, wireless network access point 108, or be in communication therewith to provide a communication link between the UAV(s) and the wireless network access point. Device 200 may include one or more network interfaces 210, one or more processors 220, and a memory 240 interconnected by a system bus 250 and powered by a power supply system 260. Also, as shown, device 200 may include any number of transceivers and antennas 255, to send and receive wireless communication signals (e.g., to provide wireless network access to other devices, etc.).

Network interface(s) 210 include the mechanical, electrical, and signaling circuitry for communicating data over wireless and/or wired links of a communication network. In one embodiment, network interface(s) 210 preferably include a wireless interface that supports Wi-Fi, cellular, or other wireless technologies to connect UAV(s) 110 to a nearby Wi-Fi network, 3G/4G cellular data network, or the like. In another embodiment, network interface(s) 210 include an interface for a hardwired network connection such as a 100 Mb/s Power over Ethernet (PoE) port. This not only provides data interconnect, but can also provide the power needed to run the device over the same physical cable, feeding energy into power supply 260. In another embodiment, network interface(s) 210 may include a near-field communication interface that uses Bluetooth or any of the emerging Internet of Things (IoT) wireless options, to communicatively connect UAV(s) 110 to any other nearby device.

Power supply system 260 may be configured to provide charging power to UAV(s) 110. In some embodiments, power supply system 260 may receive energy over a PoE network interface 210, from a solar panel, via an AC power supply line (e.g., a buried 12V AC distribution line), or from a storage cell (e.g., a battery, an ultra-capacitor, etc.). In some cases, power supply 260 may provide power to both device 200 and to the various systems/components of the (e.g., UAV(s) 110, etc.). In further embodiments, power supply system may include one or more batteries. As would be appreciated, power supply system 260 may be sized and configured accordingly, to accommodate any number of different devices and/or functions.

Memory 240 includes a plurality of storage locations that are addressable by the processor(s) 220 and the network interface(s) 210 for storing software programs and data structures associated with the embodiments described herein. Processor 220 may comprise necessary elements or logic adapted to execute the software programs and manipulate the data structures 245. Operating system 242, portions of which is typically resident in memory 240 and executed by the processor(s) 220, functionally organizes data by, inter alia, invoking operations in support of software processes and/or services executing on device 200. Illustratively, these software processes and/or services may include UAV locating process 248 that is configured to perform the operations described herein.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

In general, UAV locating process 248, when executed, may be operable to provide control over transceiver(s) and antenna(s) 255 such that wireless signals are emitted and any received wireless signals are processed, to locate a UAV in range of device 200. In some embodiments, one or more of the antennas may be capable of controlled beamforming, such as a phased-array antenna, an electronically steerable antenna, a mechanically steerable antenna, or the like. For example, UAV locating process 248 may provide control over transceiver(s) and antenna(s) 255 such that different emission patterns (e.g., operational modes) may be used as UAV-locating signals, to identify and locate nearby UAVs in the area.

Said differently, UAV locating process 248 may be operable to coordinate the detection and/or tracking of one or more UAVs via a wireless communication signal, such as a Wi-Fi signal, from one or more wireless network access points. In particular, UAV locating process 248 may enable ground based wireless access points to switch between a plurality of different modes, such as UAV-locating modes, in order to find, communicate with, and track airborne UAVs within its wireless range, which is generally much smaller than that of a typical radar. In some embodiments, a wireless network access point may transmit a first wireless communication signal based on a first mode (e.g. to initially locate an airborne UAV), and then transmit a second wireless communication signal based on a second mode (e.g., to track the located airborne UAV). Modes can be enabled independently or used together to identify and track the UAVs This multi-modal switching technique via wireless network access points would be able to track multiple UAV movements. Furthermore, multiple access points/bases may also be used and coordinated with the multiple detection modes into a single operable wireless communication system. This coordination may be achieved via cooperation of multiple instances of UAV locating process 248 on different devices 200 in a network.

During operation, UAV locating process 248 may also use cloud computing techniques (e.g., centralized processing from one or more remote servers) or fog computing techniques (e.g., extending the cloud computing paradigm to the edges of the network), to coordinate the locating of one or more UAVs, such as UAV(s) 110 shown in FIG. 1. For example, device 200 may not have a persistent Internet connection or have a limited bandwidth Internet connection. In such cases, device 200 may be configured to exchange data (e.g., delivery confirmations, status information, compartment requests, etc.) with another device (e.g., a delivery vehicle, a user device, etc.) that forwards the information to a central server, such as remote server 102. In further cases, UAV locating process 248 may send data indicative of a received UAV locating signal to another device (e.g., in the fog, cloud, a server, etc.), for the actual location determination of a UAV, or use peer-to-peer networking with nearby devices 200.

Precise UAV Tracking in 3-D Space

The techniques herein provide for tracking of one or more airborne UAVs in 3-D space using wireless communication signals transmitted and received by one or more wireless network access points, based on a plurality of locating modes. In particular, the techniques described herein enable wireless devices available in existing Wi-Fi and other communication networks, typically used for general Internet access, to also be utilized to locate and track airborne UAVs entering those areas. Multiple access points can be coordinated to provide a wider range and coverage.

Specifically, according to one or more embodiments of the disclosure as described in detail below, a wireless network access point in a network transmits a first wireless unmanned aerial vehicle (UAV)-locating signal based on a first UAV-locating mode selected from a plurality of UAV-locating modes and receives a wireless signal in response to the first transmitted UAV-locating signal that is indicative of a location of an airborne UAV. The wireless network access point causes a determination of the location of the airborne UAV based on the wireless signal received in response to the first transmitted UAV-locating signal. The wireless network access point transmits a second wireless UAV-locating signal based on a second UAV-locating mode selected from the plurality of UAV-locating modes. The selected UAV-locating modes control an emission pattern of an antenna of the wireless network access point.

Illustratively, the techniques described herein may be performed by hardware, software, and/or firmware, such as in accordance with UAV locating process 248, which may include computer executable instructions executed by the processor 220 (or independent processor of interfaces 210) to perform functions relating to the techniques described herein. Illustrated UAV locating process 248 may be operable on one or more UAV(s) and/or on a wireless network access device to provide a coordinated communication link between them, and enable identification, location, and tracking to monitor and/or control UAV traffic.

Figure 3:
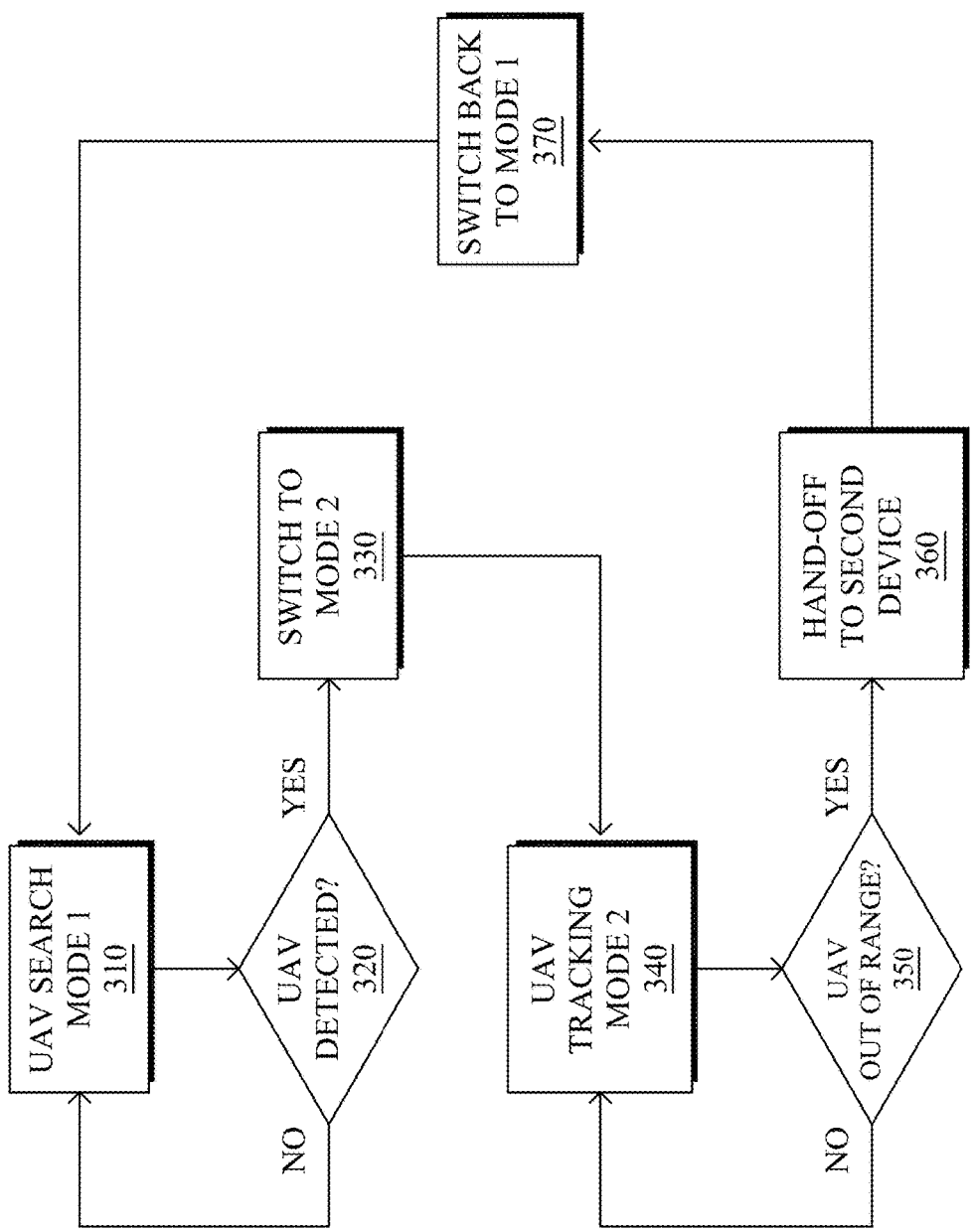
FIG. 3 illustrates an example wireless UAV locating procedure.

Operationally, FIG. 3 shows an example wireless UAV locating procedure 300, according to various embodiments of the present disclosure. In general, a specifically configured device, such as a specifically configured wireless access point, may perform procedure 300 (e.g., by executing UAV locating process 248).

As shown, at step 310 of procedure 300, the device may operate in a first UAV-locating mode, such as UAV search mode 1, which may be selected from a plurality of UAV-locating modes, to determine the presence/location of an airborne UAV. In some cases, the device/network access point itself may select UAV search mode 1. Alternatively, mode selection may occur at a different device in the network, including a second wireless network access point or a supervisory device, such as remote server 102, in communication with the wireless device and causing the wireless device to operate in the selected mode.

While in UAV search mode 1, the device may transmit a first wireless UAV-locating signal based on the selected first UAV search mode and, in turn, may receive a response signal indicative of one or more UAVs in proximity to the device. The response signal may be a passive reflection of the locating signal's radio waves off of the UAV or may be an active response in which the UAV receives the locating signal and transmits a response signal. In various embodiments, either the device itself or another device in communication therewith (e.g., a fog device, cloud device, or other supervisory device) may use any received wireless UAV locating signals to determine a location of a nearby UAV. In other words, the device/access point may either determine the UAV location locally or provide the response information to another device for further processing.

At step 320, if no UAV is detected, transmission may cease. Alternatively, the wireless network device may continue transmission (continuously or over defined intervals) using UAV search mode 1, as desired, until the presence of an airborne UAV is detected, such as by a return wireless signal received in response to the first transmitted UAV-locating signal.

Once the device detects a UAV, procedure 300 may continue on to step 330 where the wireless network device may switch to a second UAV-locating mode that is different from the first UAV-locating mode. For example, while the first mode may be more broad-based (e.g., a sweep of the area, a wide emission pattern, etc.), the second mode may instead be more directed (e.g., to continue to locate the detected UAV with more precision using finer beams or slower sweeps). The device may affect the switchover itself or may do so in response to a command from a supervisory device.

More specifically, at step 340, the device may transmit a second wireless UAV-locating signal based on the selected second UAV-locating mode, such as UAV tracking mode 2. Transmission may continue until it is determined, at step 350, that the airborne UAV is out of range of the wireless network device, and, at step 360, communication may be transferred to a second wireless network device, which may be a device in the same network (e.g., network 104) or in a different network. For example, the device may notify a fog controller or other supervisory device when it no longer receives UAV locating signals for the tracked UAV (or if the UAV is close to being out of range of the device), to cause another wireless network access point to continue to track the UAV. After hand-off, the wireless network device may revert back to its previous UAV-locating mode from the plurality of UAV-location modes (e.g. UAV search mode 1 or another search mode).

Figure 4A:
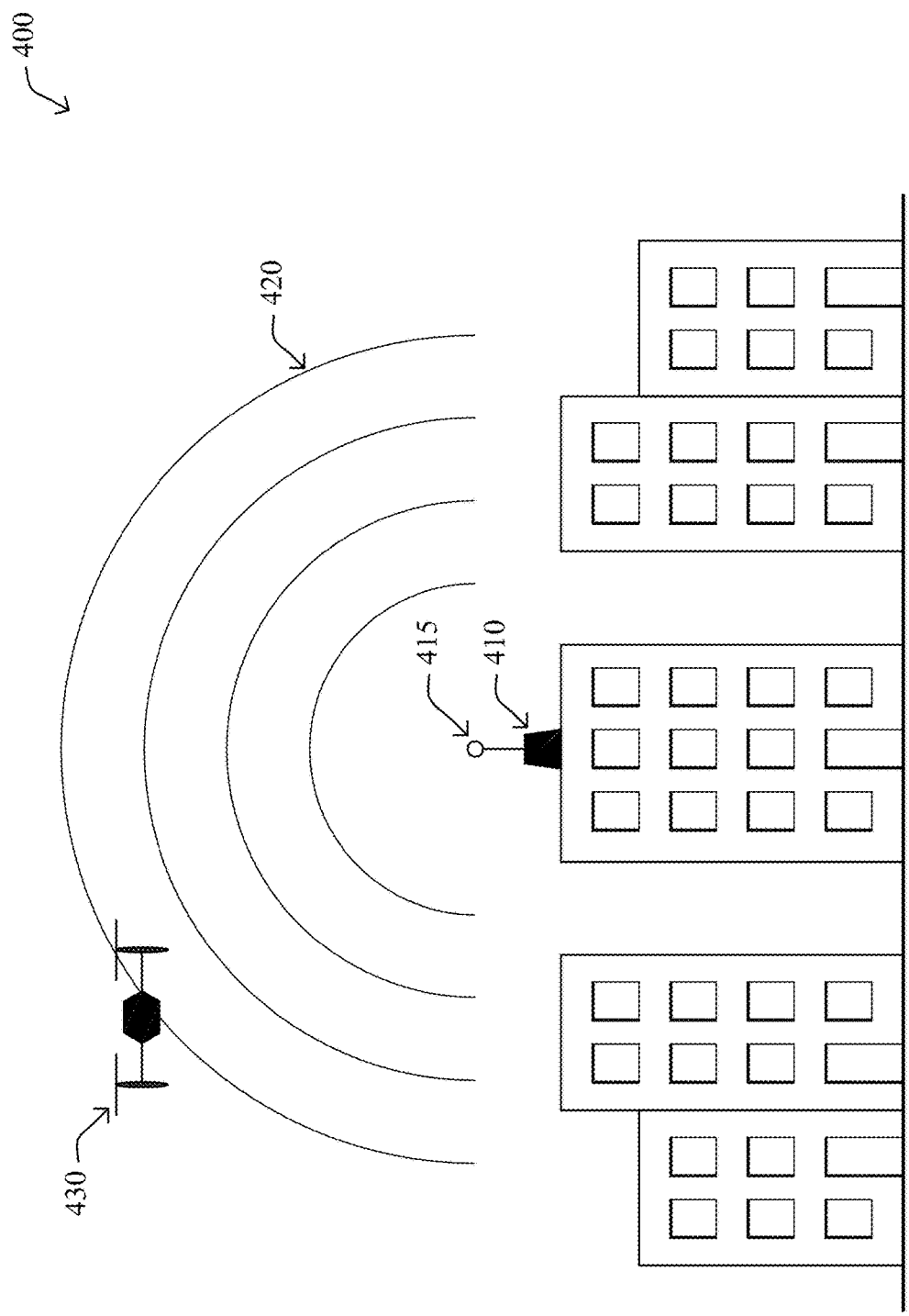
FIGS. 4A-4B illustrate an example procedure based on a first UAV-locating mode.
Figure 4B:
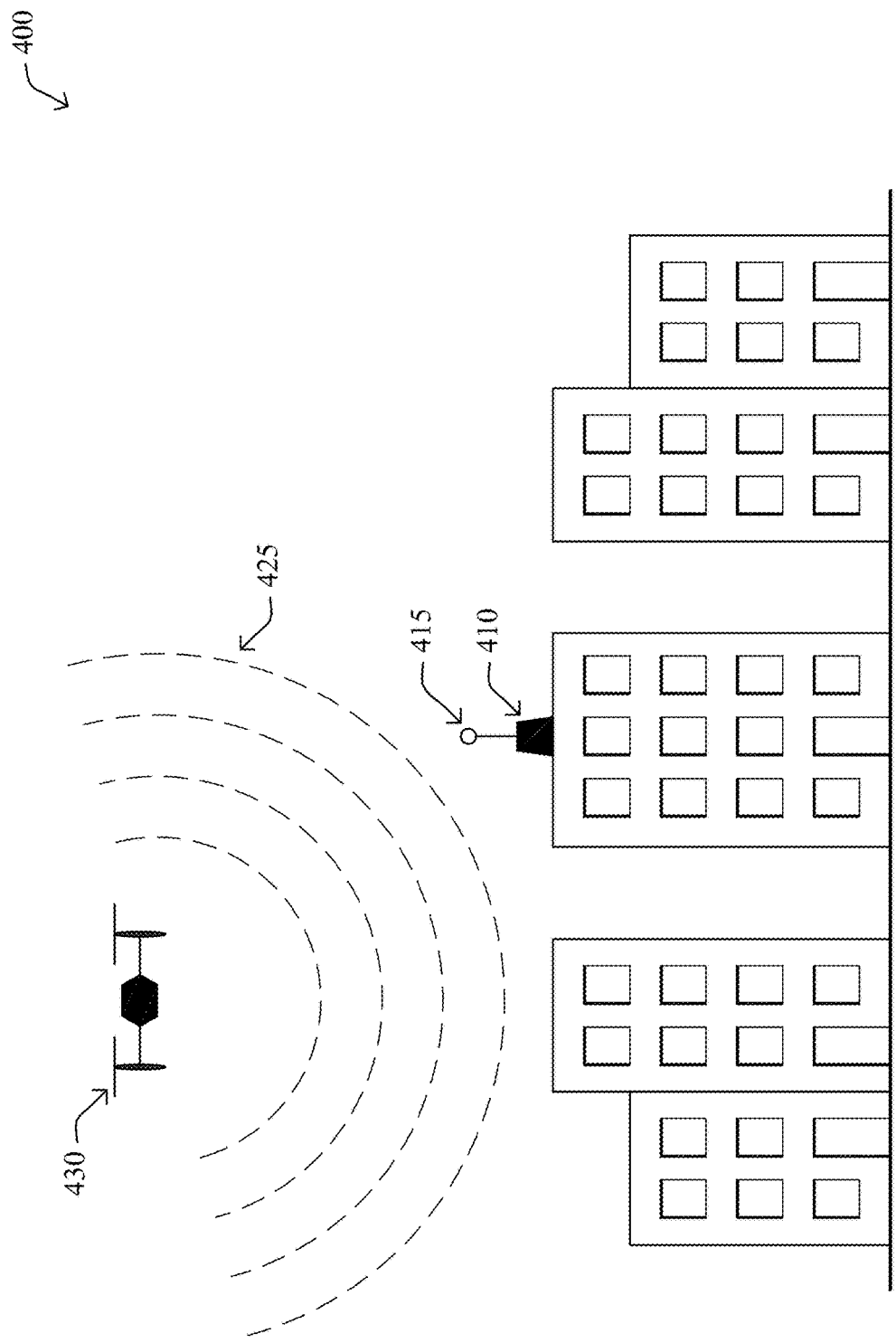

A specific embodiment of the present disclosure is illustrated in FIGS. 4A-4B. As shown in FIG. 4A, a wireless network access device, such as wireless network access point 410, may transmit a first wireless UAV-locating signal, such as wireless communication signal 420, based on a first UAV-locating mode selected from a plurality of UAV-locating modes. The selected mode may control an emission pattern of an antenna of the wireless network access point. In some embodiments, wireless network access point 410 may comprise one or more directional antennas 415, such as a phased array antenna or other antenna that allows for controlled beamforming or beam redirection.

In antenna theory, a phased array antenna is an array of radiating elements in which the relative phases of the respective signals feeding the elements are set in such a way that the effective radiation pattern of the array is reinforced in a desired direction and suppressed in undesired directions. A phased array may be used to point a fixed radiation pattern in a target direction or to scan rapidly in azimuth or elevation.

In cases in which directional antenna(s) 415 include a phased array antenna or other controllable antenna, wireless network access point 410 may transmit a scanning signal across azimuth and elevation angles of a hemisphere centered at the wireless device. For example, directional antenna 415 of wireless network access point 410 may transmit a narrow beam at a series of azimuth/elevation angles in rapid sequence to scan the hemispherical volume of airspace within its range. Note that the UAV-locating signals may, in some embodiments, be of the type typically emitted by a network access point, such as a communication signal or the like.

In response, as shown in FIG. 4B, targets within range, such as airborne UAV 430, may provide a return wireless signal (e.g., wireless signal 425) that is received by wireless access point 410. In some embodiments, the wireless network device that transmitted the first UAV-locating signal (e.g., wireless network access point 410) may receive a portion of the transmitted signal reflected back from the airborne UAV (e.g., UAV 430) detectable, for example, by its same phased array antenna. In other embodiments, wireless network access point 410 may receive a return wireless signal transmitted from the airborne UAV (e.g., a wireless communication, as opposed to a reflected signal).

As a specific example, for the maximum allowable power in the Industrial, Scientific, and Medical (ISM) band with a directional antenna, an outdoor Wi-Fi signal may have a signal range out to 1.5 to 2.5 km. A wireless network access point transmitting an RF pulse toward a potential target at 2 km within that angle would need to wait for a round-trip time of approximately 13 microseconds. Single angle scans can be performed at a rate of 75,000 angles per second. Assuming 2 degree separation for both azimuth and elevation, there are 180 azimuths with 45 elevation angles each (a total of 8,100 angles) in a full hemispherical scan. As a result, the example wireless network device may therefore perform about nine full scans per second (75,000 angles per second/8,100 angles), which would be an adequate refresh frequency and angular resolution for surveying and tracking airborne UAV applications.

Thus, in some embodiments, a wireless network access point in a network may transmit a first wireless UAV-locating signal based on a first UAV-locating mode selected by the device or another device in the network (e.g., a supervisory device). A wireless signal may then be received at the device, which, in some embodiments, may be one or more portions of the first transmitted signal returned/reflected back by an airborne UAV within range of the wireless network access device. The response signal may be indicative of the location of the airborne UAV, and, in some embodiments of the present disclosure, the wireless network access point may cause a determination of the location of the airborne UAV based on the received signal (e.g., by determining the location locally, by sending the signal information to another device, etc.).

Figure 5:
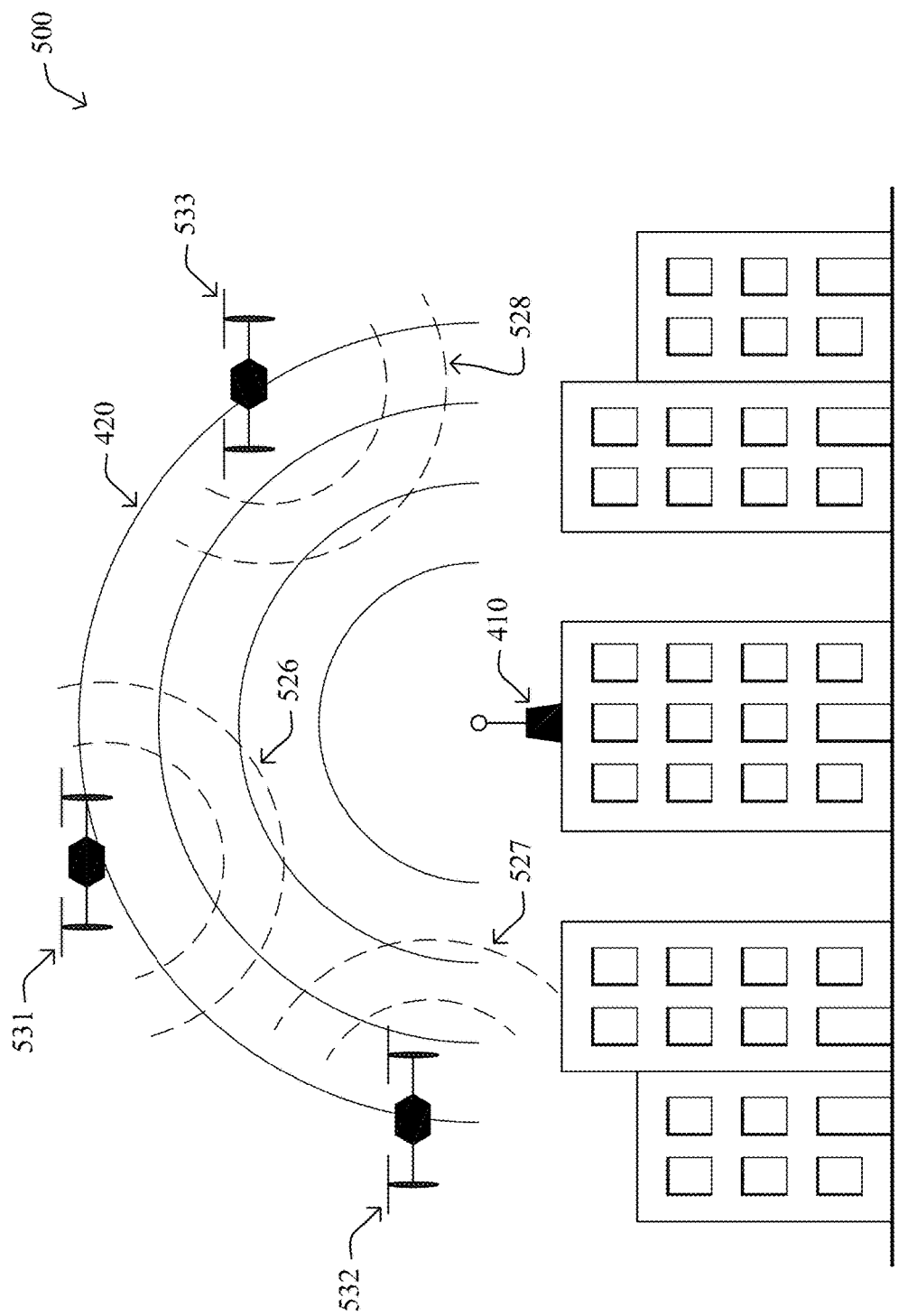
FIG. 5 illustrates an example procedure based on a first UAV-locating mode with a plurality of airborne UAVs.

Furthermore, the location of multiple airborne UAVs may also be determined, based on receiving multiple returned wireless signals, each indicative of a location of a different airborne UAV. For example, as shown in FIG. 5, transmission of wireless communication signal 420 may return multiple wireless signals 526, 527, and 528, indicative of the location of airborne UAVs 531, 532, and 533 respectively. Thus, the first selected UAV-locating mode may be a search mode in which the location of one or more discovered UAV is determined relative to the wireless network access point. In the specific example discussed above, the location precision of a 2 degree scan resolution at a 2 km range may be approximately 70 meters.

Figure 6A:
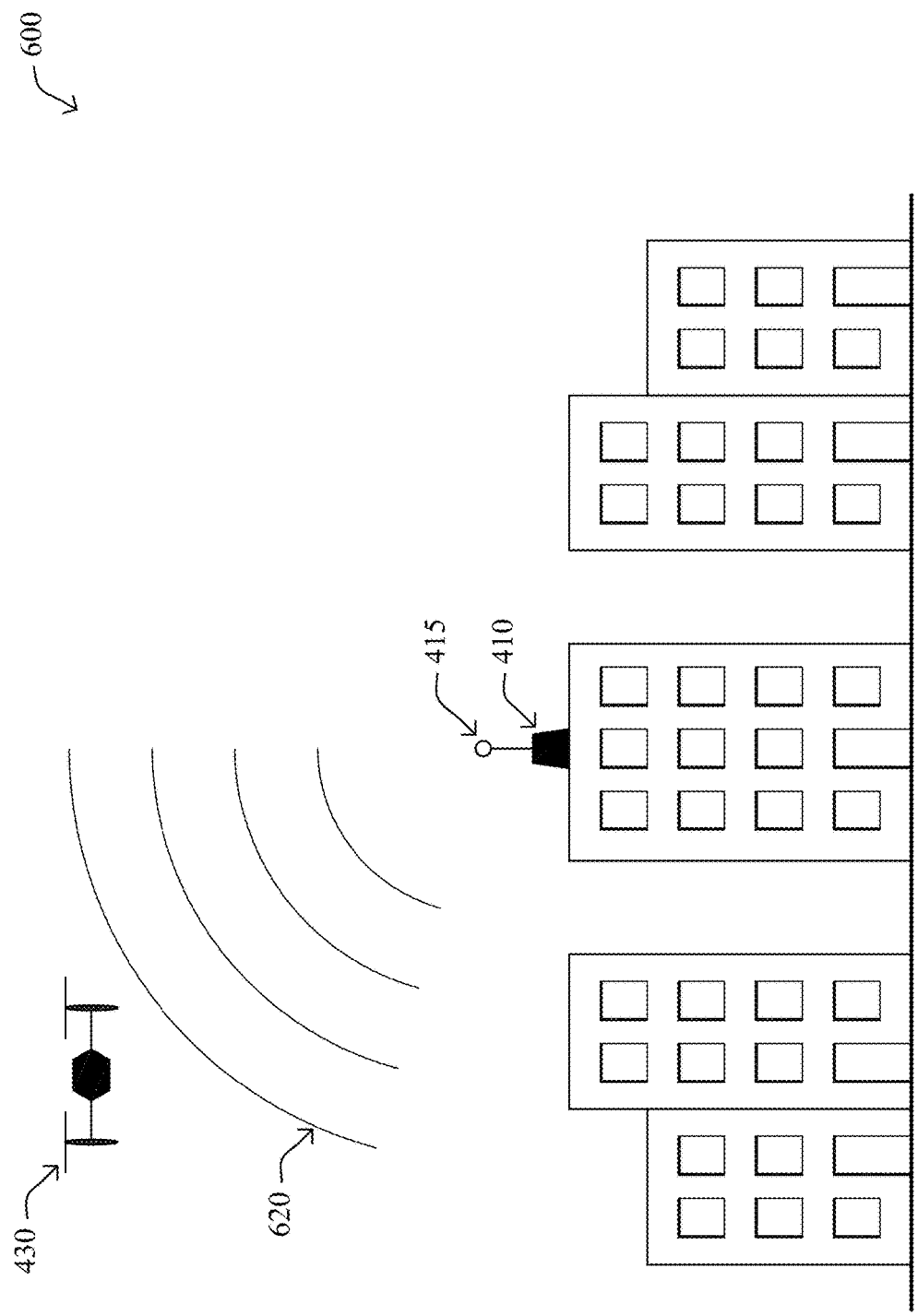
FIGS. 6A-6B illustrate an example procedure based on a second UAV-locating mode.
Figure 6B:
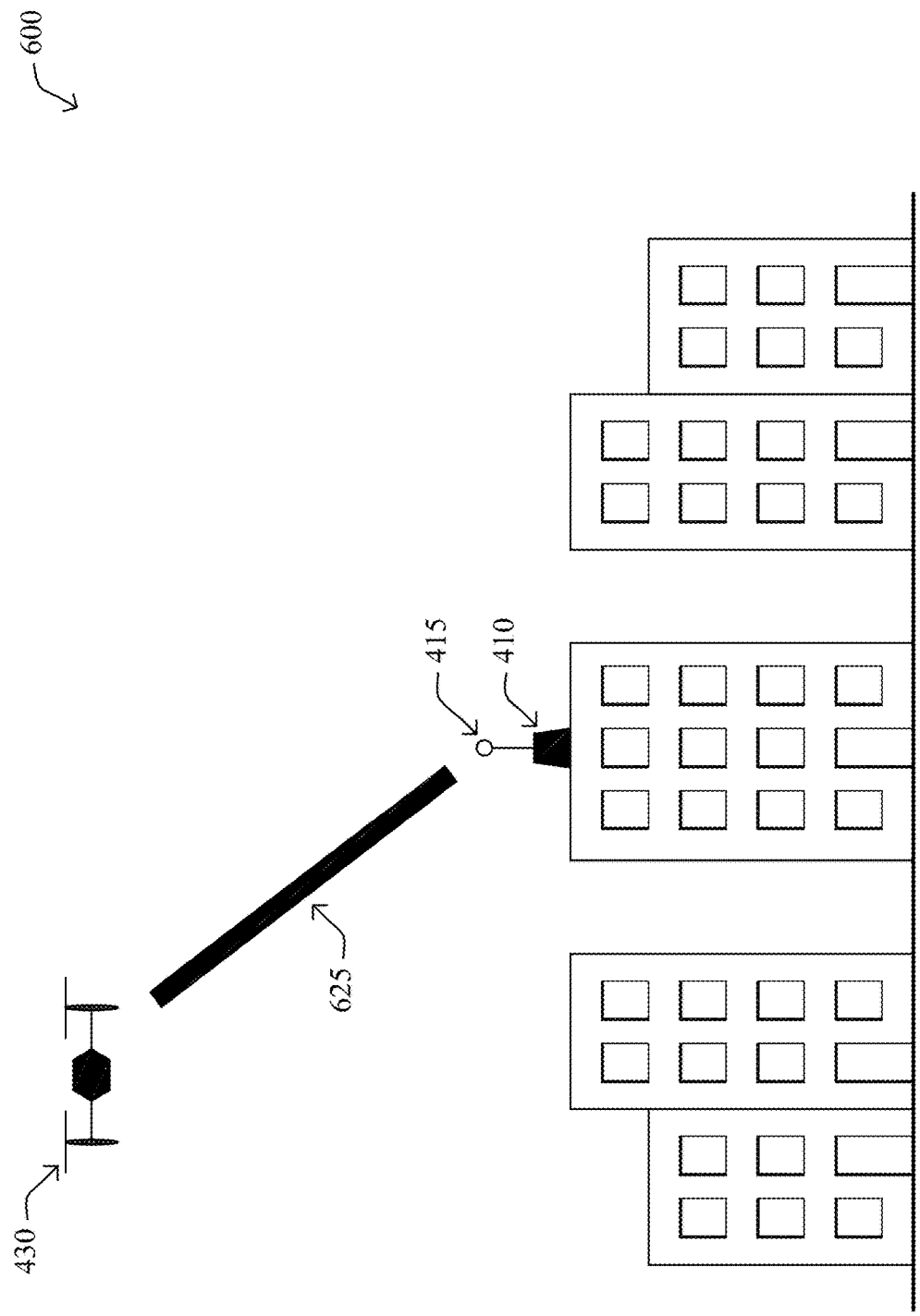

Once the location of an airborne UAV is determined, in some embodiments, the wireless network device may also track the airborne UAV based on the received wireless signal, as shown in FIGS. 6A-6B. For example, in FIG. 6A, antenna 415 of wireless network access point 410 may transmit a second wireless UAV-locating signal (e.g., second wireless communication signal 620) towards the determined location of airborne UAV 430. The second transmitted signal may be based on a second UAV-locating mode selected from the plurality of UAV-locating modes. Tracking may comprise transmitting and receiving multiple wireless signals towards and from the airborne UAV, continuously or over chosen time intervals.

Thus, in some embodiments of the present disclosure, the wireless network device may switch from a first mode (e.g., a UAV searching mode) to a second mode (e.g., a UAV tracking mode). Each mode may control the emission pattern of the antenna of the wireless network device. For example, beam patterns of phased arrays are programmable. Once an airborne UAV has been located by the hemispherical scan described above, the directed beam may be focused/narrowed down and signal processing may be applied to average the position fix across many transmit intervals, and more precise (but potentially somewhat slower) beam deflection algorithms may be applied, thereby improving the location precision to approximately 1 meter. Thus, in some embodiments of the present disclosure, beam-steering may be engaged by the wireless device to track airborne UAVs in a 3-D space.

Furthermore, by controlling the instantaneous angles of the steerable beams, multiple targets may be tracked from one wireless network access point. Time on the wireless device may be shared between, for example, the survey scan shown in FIG. 4A and a mode in which the transmitted signal is rapidly swept between the positions of all of the airborne UAVs detected. Beams may also be configured to dwell at the positions of the UAVs for a comparatively long time, allowing multiple readings and higher precision of angles and range. The profile of the transmitted wireless signal may also vary. For example, beam profiles may start fairly wide (such as a few degrees) and rapidly narrow to fractions of a degree to zero in on the exact location and range of the airborne UAV.

In some embodiments, the wireless network access point may cause the determination of one or more characteristic features of the airborne UAV. The determination may be by the device or an additional device in the network, such as a supervisory device, and may be based, at least in part, on the received wireless signal from the airborne UAV. In particular, as shown in FIG. 6B, wireless signal 625, received by antenna 415 of wireless network access point 410 from airborne UAV 430 may be used to determine various features important to the operation and/or condition of the airborne UAV. For example, the wireless network device may perform high precision measurements of the returned signal strength and other RF characteristics to identify and/or confirm the identity of the airborne UAV (e.g., the model type of the UAV). Also, the wireless device may cause the determination of an estimate of the weight or size of the UAV payload. Furthermore, the variance of the received return signal over time may be detected, from which measurements may be determined of the propeller speed. Doppler shifts in the received wireless signal may be used to cause the determination of UAV velocities. In addition, if multiple UAVs have been identified, the wireless access point may cause feature determinations of each of them, simultaneously or sequentially.

In some embodiments, the wireless network device may also receive a second wireless signal in response to a second transmitted UAV-locating signal. The second received signal may be different from the first received signal. For example, the second signal may have a reduced signal characteristic than the first received signal, indicating changes to the position/location of the airborne UAV. Also, signaling rate may be different. The wireless network access point may switch between multiple modes in series or in parallel to provide a location system having very high precision and high search and tracking speeds and may exhibit immunity from interference, jamming, or hacking.

In a further mode of operation, the location of a UAV may be based on preambles/beacons sent by the UAV that can then be used by any nearby ground stations (e.g., wireless network access point 410, etc.), to confirm the identity of the UAV and determine its locations. In particular, active transmitters and receivers present on the UAVs may be used in conjunction with the fixed ground wireless network access point. For example, an airborne UAV may produce a preamble signal, and multiple receiving wireless network access points (e.g. at fixed locations on the ground) may correlate the angle and time of reception to get a precise estimate of the UAV's position. In another embodiment, a wireless network access point may transmit a wireless UAV-locating signal (e.g., to cause the determination of the UAV location) and, only when the airborne UAV receives the transmitted signal (an interrogation) will it transmit a wireless signal to the sending wireless network device (send a reply). In another embodiment, multiple wireless network access points may broadcast carefully time synchronized signals. An airborne UAV may passively receive these transmitted wireless signals and may estimate its own location, using algorithms such as by measuring the time of flight and consulting an almanac of ground stations.

Figure 7:
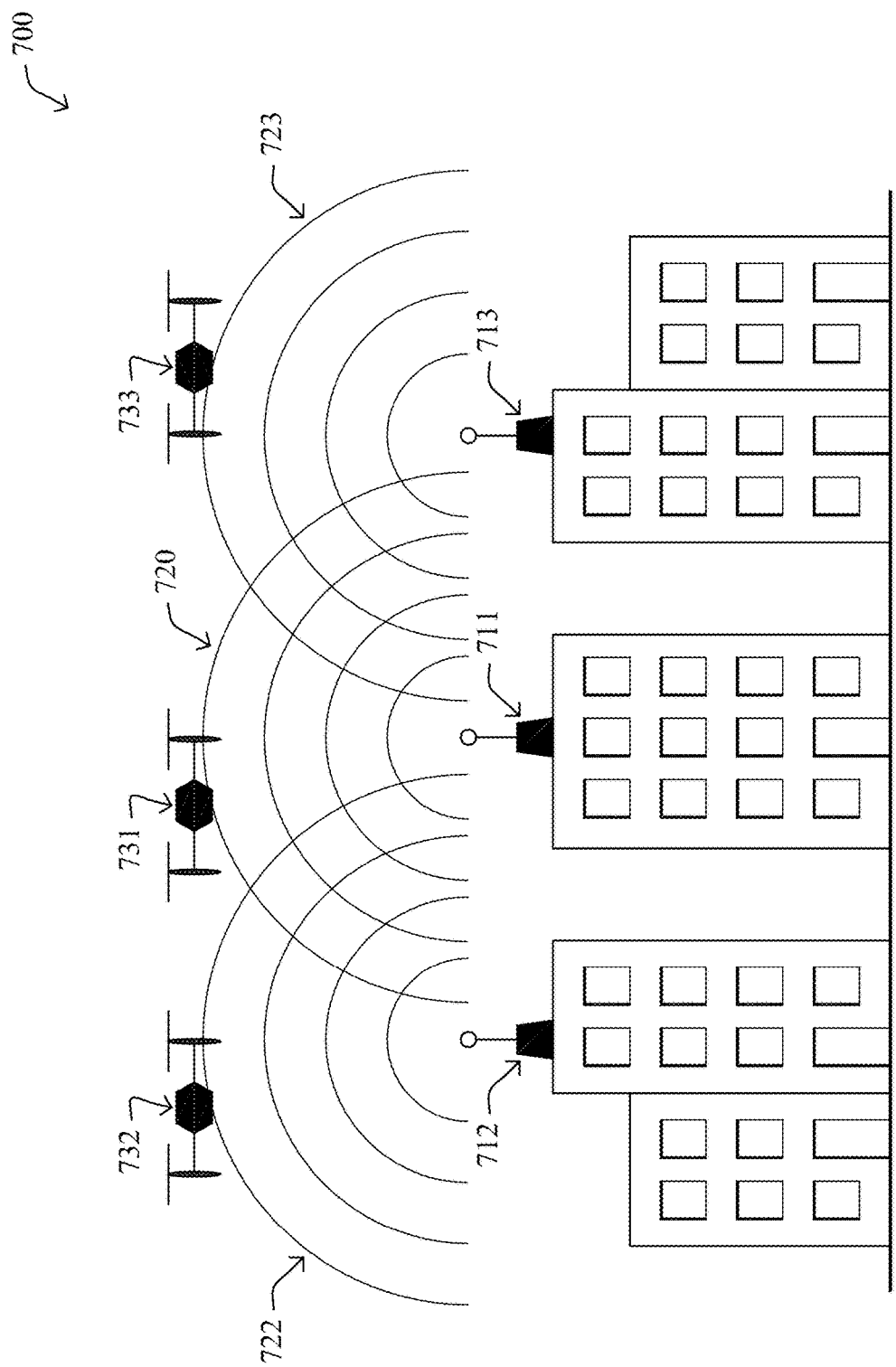
FIG. 7 illustrates an example of system with a plurality of network devices/wireless network access points.

In another embodiment, multiple nearby wireless network devices may be used cooperatively to provide higher resolution data, for example resolving angular ambiguities, canceling multipath interference, providing jamming immunity, and providing fault tolerance. For example, as shown in FIG. 7, wireless network access 711, 712, and 713 may transmit communication signals 721, 722, and 723 respectively, causing the determination of the locations of multiple UAVs 731, 732, and 733. Coordination between the various access points may occur in various ways. For example, two nearby wireless access points may be coordinated, one scanning the one quarter-sphere and the other scanning a different quarter-sphere, each transmitting a wireless signal based on a first UAV-locating mode (e.g., a UAV searching mode), together completing the scan in half the time. As another example, one wireless network access point may be responsible for full-sky transmitting of a wireless signal based on a first UAV-locating mode (e.g., a UAV searching mode), and may subsequently pass off any received wireless signal information to a different wireless network access point in order to perform higher resolution multiple-target tracking, such as transmitting a UAV-locating signal based on a second UAV-locating mode (e.g., a UAV tracking mode).

As a specific example, a Wi-Fi network comprising a plurality (e.g. tens or hundreds) of Wi-Fi access points may be coordinated in a net fashion. Perimeter wireless base stations may be responsible for transmitting and receiving wireless signals to cause the determination of airborne UAV locations and detecting UAVs flying into the system's perimeter while wireless base stations physically positioned in the middle of the wireless network may be focused on accurately tracking individual UAVs in flight. Depending on the network and geographical topology, various modes can be tailored and customized across individual wireless network devices.

Use of multiple wireless network devices would provide some advantages. In particular, different wireless network access points may have different RF environments, which an adaptive algorithm could exploit. For example, a wireless access point fixed on a tall building may need to track a low-flying UAV at a basically horizontal elevation angle, which could lead to ground-based interference problems. Another wireless access point on an adjacent lower building may have a higher elevation angle, which may be more immune to interference. Some positions in the sky may be in various RF shadow or multi-path zones where high resolution position fixes are difficult, especially in dense city or "urban canyon" environments. However nearby wireless access points may not generally have the identical dead spots. In addition, fog or cloud-based applications may be capable of stitching together the 3-D views of several cooperating wireless access points to achieve nearly continuous horizon-to-horizon coverage, with excellent scan updates and tracking precision.

Figure 8:
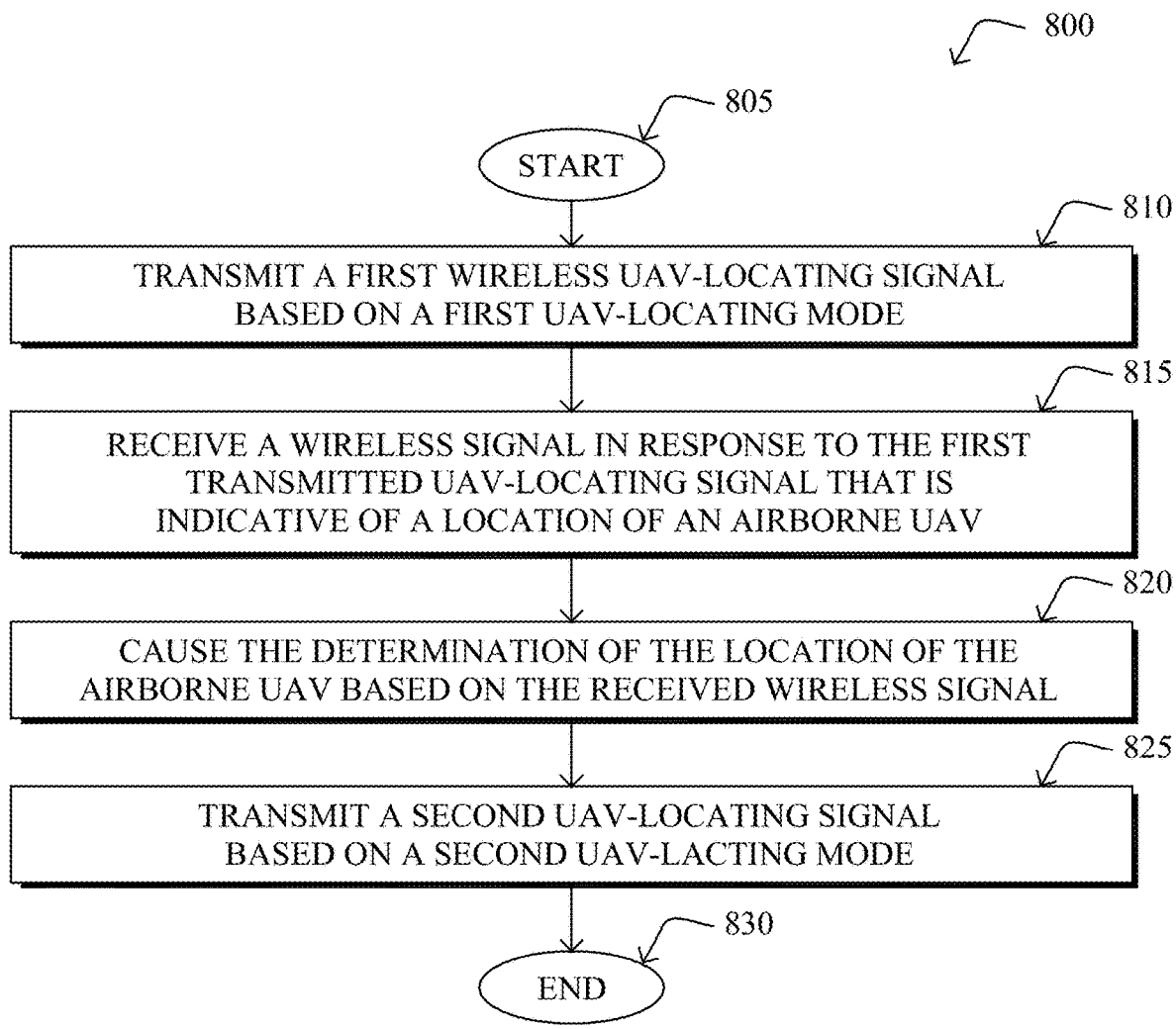
FIG. 8 illustrates an example simplified UAV communication procedure.

FIG. 8 illustrates an example simplified procedure for transmitting and receiving wireless UAV-locating signals in a wireless network in accordance with one or more embodiments described herein. For example, a non-generic, specifically configured device (e.g., device 200) may perform procedure 800 by executing stored instructions (e.g., UAV locating process 248). The procedure 800 may start at step 805, and continues to step 810, where, as described in greater detail above, a wireless network device (e.g., a wireless network access point) in a network may transmit a first wireless UAV-locating signal based on a first UAV-locating mode selected from a plurality of UAV-locating modes. The wireless network access point may comprise an antenna such as a phase array antenna. Selection of the first UAV-locating mode may be by the wireless network access point, a second wireless network access point in the network, or a supervisory devise in the network.

In step 815, the wireless network access point may receive a wireless signal in response to the first transmitted UAV-locating signal. As described in greater detail above, the response signal may include one or more portions of the transmitted first wireless UAV-locating signal reflected back from an airborne UAV (e.g., a reflection of the signal). Alternatively, the airborne UAV may transmit a wireless signal to the wireless network access point in response to the first transmitted UAV-locating signal.

In step 820, the wireless network access point may cause a determination of the location of the airborne UAV based on the wireless signal received in response to the first transmitted UAV-locating signal, as described in greater detail above. The location of multiple airborne UAVs may also be determined, based on multiple received wireless signals. Location determination may be by the wireless network access point or by other device(s) in the network (e.g., at a fog node, by a cloud device, etc.).

In step 825, the wireless network access point may transmit a second wireless UAV-locating signal based on a second UAV-locating mode selected from the plurality of UAV-locating modes. As described in greater detail above, the wireless network access point may track the airborne UAV based, at least in part on the received wireless signal. In addition, the wireless network access point further may cause a determination of one or more characteristics of the airborne UAV based on signal strength of the received wireless signal and/or based on signal variance or other RF characteristics of the received wireless signal. Furthermore, the wireless network access device may receive a second wireless signal, having a reduced signal characteristic from the received first wireless signal. Procedure 800 then ends at step 830.

It should be noted that while certain steps within procedure 800 may be optional as described above, the steps shown in FIG. 8 is merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a UAV communication process, capable of identifying and tracking airborne UAVs with wireless devices in communication with a network. The wireless network devices are capable of switching between various UAV-locating modes, selected from a plurality of UAV-locating modes. The devices transmit and receive wireless signals from airborne UAVs and cause the determination of the airborne UAV location and characteristics, based on the receive wireless signal. The UAV-locating modes control emission patterns of an antenna of the wireless network access point.

While there have been shown and described illustrative embodiments that provide for dynamically tracking/modeling systems according to risk level, it is to be understood that various other adaptations and modifications may be made within the spirit and scope of the embodiments herein. For example, while certain embodiments are described herein with respect to using and switching between certain modes (e.g. UAV-searching modes and UAV-tracking modes), the plurality of modes are not limited as such and other modes may also be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    transmitting, by a wireless network access point in a network, a first wireless unmanned aerial vehicle (UAV)-locating signal based on a first UAV-locating mode selected from a plurality of UAV-locating modes, the first UAV-locating mode causing the wireless network access point to search for local UAVs, wherein the wireless network access point is a base station or a router;
    receiving, at the wireless network access point, a plurality of wireless signals in response to the first transmitted UAV-locating signal, wherein the plurality of wireless signals are indicative of locations of a plurality of airborne UAVs;
    detecting, by the wireless network access point, each of the plurality of airborne UAVs and causing a determination to be made regarding a location of each of the plurality of airborne UAVs based on each of the wireless signals received;
    in response to detecting at least one UAV of the plurality of airborne UAVs, switching, by the wireless network access point, to a second UAV-locating mode to track the UAV;
    transmitting, by the wireless network access point, a second wireless UAV-locating signal based on a second UAV-locating mode selected from the plurality of UAV-locating modes;
    tracking, by the wireless network access point while in the second UAV-locating mode, the plurality of airborne UAVs; and
    wherein the first and second UAV-locating modes control the wireless network access point to emit different emission patterns from an antenna of the wireless network access point.

2. The method of claim 1, wherein the UAV-locating modes are selected by the wireless network access point, by a second wireless network access point in the network, or by a supervisory device in the network.

3. The method of claim 1, wherein the antenna of the wireless network access point is a phase array antenna.

4. The method of claim 1, wherein the first UAV-locating signal is transmitted as a scanning signal across azimuth and elevation angles of a hemisphere centered at the wireless network access point.

5. The method of claim 1, wherein the received wireless signal is a portion of the transmitted first UAV-locating signal reflected back from the airborne UAV.

6. The method of claim 1, wherein the method further comprises:
    causing, by the wireless network access point, a determination of one or more characteristic features of the plurality of airborne UAVs based on signal strength of the received wireless signal.

7. The method of claim 6, wherein the characteristic feature is UAV model type, payload weight estimate, or payload size estimate.

8. The method of claim 1, wherein the method further comprises:

causing, by the wireless network access point, a determination of one or more characteristic features of the airborne UAV based on signal variance of the received wireless signal.

9. The method of claim 1, wherein the method further comprises:
causing, by the wireless network access point, a determination of UAV velocity based on Doppler shifts of the received wireless signal.

10. The method of claim 1, wherein the received wireless signal is a response signal transmitted by each of the plurality of airborne UAVs.

11. The method of claim 10, wherein the received wireless signal is a preamble signal.

12. The method of claim 1, wherein the method further comprises:
receiving, at the wireless network access point, a second wireless signal in response to the second transmitted UAV-locating signal, wherein the received second signal has a reduced signal characteristic than the received first wireless signal.

13. The method of claim 12, wherein the signal characteristic is signaling rate.

14. The method of claim 1, wherein the wireless network access point:
transmits a plurality of second wireless UAV-locating signals.

15. The method of claim 1, wherein the location of the plurality of airborne UAVs is determined by a cloud device or a fog device.

16. A wireless network access point comprising:
one or more network interfaces to communicate within a computer network;
a processor coupled to the network interfaces and configured to execute one or more processes; and
a memory configured to store a process executable by the processor, the process when executed operable to:
transmit a first wireless unmanned aerial vehicle (UAV)-locating signal based on a first UAV-locating mode selected from a plurality of UAV-locating modes, the first UAV-locating mode causing the wireless network access point to search for local UAVs, wherein the wireless network access point is a base station or a router;
base station or a router;
receive a plurality of wireless signals in response to the first transmitted UAV-locating signal, wherein the plurality of wireless signals are indicative of locations of a plurality of airborne UAVs;
detect each of the plurality of airborne UAVs and causing a determination to be made regarding a location of each of the plurality of airborne UAVs based on each of the wireless signals received;
in response to detecting the UAV, switch to a second UAV-locating mode selected from the plurality of UAV-locating modes to track the UAV;
transmit a second wireless UAV-locating signal based on the second UAV-locating mode;
track, while in the second UAV-locating mode, the plurality of airborne UAVs; and
wherein the first and second UAV-locating modes control the wireless network access point to emit different emission patterns from an antenna of the wireless network access point.

17. A tangible, non-transitory, computer-readable media having software encoded thereon, the software, when executed by a processor operable to:
transmit a first wireless unmanned aerial vehicle (UAV)-locating signal based on a first UAV-locating mode selected from a plurality of UAV-locating modes, the first UAV-locating mode causing a wireless network access point to search for local UAVs, wherein the wireless network access point is a base station or a router;
receive a plurality of wireless signals in response to the first transmitted UAV-locating signal, wherein the plurality of wireless signals are indicative of locations of a plurality of airborne UAVs;
detect each of the plurality of airborne UAVs and causing a determination to be made regarding a location of each of the plurality of airborne UAVs based on each of the wireless signals received;
in response detecting at least one UAV of the plurality of airborne UAVs, switching, by the wireless network access point, to a second UAV-locating mode to track the UAV;
transmit a second wireless UAV-locating signal based on the second UAV-locating mode;
track, while in the second UAV-locating mode, the plurality of airborne UAVs; and
wherein the first and second UAV-locating modes control the wireless network access point to emit different emission patterns from an antenna of the wireless network access point.

* * * * *

UNITED STATES PATENT AND TRADEMARK OFFICE
CERTIFICATE OF CORRECTION

PATENT NO. : 10,568,063 B2
APPLICATION NO. : 15/364984
DATED : February 18, 2020
INVENTOR(S) : Michael David Hanes et al.

Page 1 of 1

It is certified that error appears in the above-identified patent and that said Letters Patent is hereby corrected as shown below:

In the Claims

Column 13, Line 46, delete:
"base station or a router;"

Signed and Sealed this
Second Day of June, 2020

Andrei Iancu
*Director of the United States Patent and Trademark Office*